United States Patent [19]
Platzer

[11] Patent Number: 5,975,462
[45] Date of Patent: Nov. 2, 1999

[54] INTEGRATED PROPULSION/LIFT/ CONTROL SYSTEM FOR AIRCRAFT AND SHIP APPLICATIONS

[75] Inventor: Maximilian F. Platzer, Pebble Beach, Calif.

[73] Assignee: The United States of America as represented by the Secretary of the Navy, Washington, D.C.

[21] Appl. No.: 09/140,970

[22] Filed: Aug. 27, 1998

Related U.S. Application Data

[63] Continuation of application No. 08/739,761, Oct. 30, 1996, abandoned.

[51] Int. Cl.$^6$ ..................................................... B64C 21/00
[52] U.S. Cl. ............................... 244/11; 244/72; 244/204; 244/130
[58] Field of Search ................................... 244/204, 203, 244/201, 198, 130, 72, 22, 11, 215, 213; 440/13

[56] References Cited

U.S. PATENT DOCUMENTS

| | | | |
|---|---|---|---|
| 2,514,639 | 7/1950 | Haack | 244/72 |
| 4,081,155 | 3/1978 | Kuan | 244/72 |
| 5,209,438 | 5/1993 | Wygnanski | 244/204 |
| 5,226,618 | 7/1993 | Greenhalgh | 244/215 |
| 5,401,196 | 3/1995 | Triantafyllou et al. | 440/13 |
| 5,613,649 | 3/1997 | Schlinker et al. | 244/204 |

FOREIGN PATENT DOCUMENTS

| | | | |
|---|---|---|---|
| 586496 | 10/1933 | Germany | 244/204 |
| 2107426 | 4/1983 | United Kingdom | 244/204 |

*Primary Examiner*—Galen L. Barefoot
*Attorney, Agent, or Firm*—Donald E. Lincoln

[57] ABSTRACT

A new method for boundary layer energization and boundary layer propulsion for use on vehicles moving through fluids, which comprises mounting small airfoils parallel or perpendicular to the vehicle's surface, said airfoils being embedded within the said vehicle's boundary layer and juxtaposed the surface of said vehicle, said airfoils being approximately the height of the boundary layer thickness and exciting said airfoils into flapping oscillation parallel to the chord plane of said airfoils, said oscillation at a frequency up to 100 cycles per second at an amplitude up to 20 percent of the chord length of said airfoil, whereby flow separation is delayed or suppressed which enables the redesign of said vehicle.

16 Claims, 15 Drawing Sheets

Experimental Airfoil length 28cm
front diameter 2.54cm
rear diameter 4.45cm

— cusp t.e.
---- half cylinder t.e.

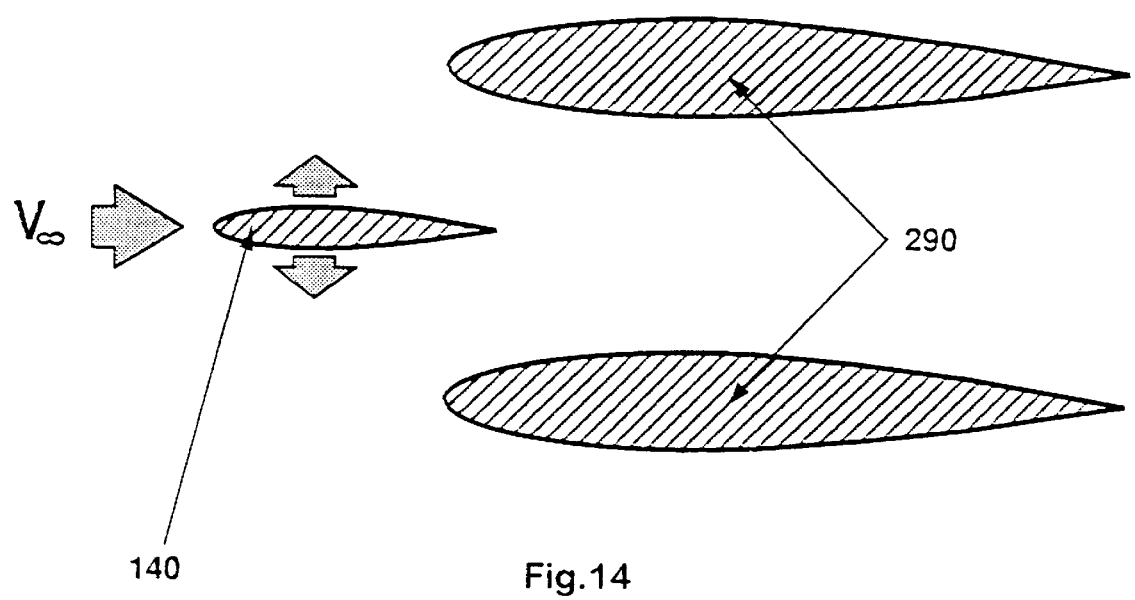
140   Fig.14

INTEGRATED PROPULSION/LIFT/CONTROL SYSTEM FOR AIRCRAFT AND SHIP APPLICATIONS

This is a continuation of earlier filed application Ser. No. 08/739,761 of Maximilian F. Platzer, filed on Oct. 30, 1996 now abandoned.

BACKGROUND OF THE INVENTION

1. Filed of the Invention

This invention relates to aircraft and ship boundary layer propulsion (thrust generation) mechanisms employing flapping foils. It further relates to aerodynamic or hydrodynamic lift systems employing flapping foils. This invention also relates to aerodynamic and hydrodynamic drag generated on aircraft and ships. More precisely, it relates to aerodynamic/hydrodynamic control systems employing flapping foils, including the delay or prevention of flow separation in general fluid flow systems.

2. Background of the Invention

It is firmly established that fluid flow over most air and marine vehicles occurs at such large Reynolds numbers that the viscous forces acting on the fluid particles are of importance only in a very thin layer surrounding the vehicle. The remainder of the fluid flow field can be regarded as inviscid (frictionless). The Reynolds number signifies the ratio of the fluid particle's inertia force to the viscous force. Typically, the inertia force is several hundred thousand or million times larger than the viscous force. As a result, the thin fluid particle layer (which is usually referred to as "boundary layer") developing on an aircraft wing typically has a thickness of only one or two percent of the aircraft wing's chord length.

Over the years, it has also been recognized that the type of fluid flow which develops in the boundary layer has a decisive effect on the air or marine vehicle's drag. One distinguishes between the two types of fluid flow, namely "laminar flow" and "turbulent flow". The laminar fluid flow is a well-ordered steady flow, whereas the turbulent fluid flow is characterized by small irregular fluctuations about a steady mean flow. The friction force exerted by a laminar flow's boundary layer on the vehicle's outer surface exposed to the laminar flow is significantly smaller than the friction force generated by a turbulent flow's boundary layer. On the other hand, a laminar flow boundary layer has a much greater proclivity to separate (detach) from the vehicle's surface than a turbulent flow boundary layer. Separated flow produces a different type of drag, which is usually referred to as "pressure drag". Large regions of flow separation may produce huge increases in pressure drag. Hence efficient air or marine vehicle design requires the minimization of both skin friction and pressure drag.

DESCRIPTION OF THE RELATED ART

Heretofore, the problems of (i) thrust generation and (ii) drag reduction were generally regarded as two separate independent problems for most vehicles with the exception of hypersonic and aerospace planes. There is one notable exception, however. F. H. Reynst proposed, in the book "Pulsating Combustion", Pergamon Press 1961, the boundary layer propulsion concept and the use of pulsating combustors for its implementation. An analysis of the advantages of boundary layer propulsion was also published by A. M. O. Smith and H. E. Howard in the *Journal of Aeronautical Sciences*, February 1947, pp. 97–109. Unfortunately, no work was done on Reynst's proposed boundary layer propulsion system and therefore no information exists on the practicality and efficiency of his propulsion system.

It is clear from the above description of the boundary layer behavior that great benefits in terms of lift increase and/or drag reduction can be achieved by effective boundary layer control. For this reason, much effort has been expended over the years to devise and demonstrate various boundary layer control methods. These can be classified as follows:

a) "Boundary Layer Suction." As reviewed, for example, in the two volumes on "Boundary Layer and Flow Control", edited by G. V. Lachmann' Pergamon Press 1961, the most obvious boundary layer control method is the removal of most of the boundary layer over most of the air or marine vehicle by means of a suitable suction system. The importance of increasing the stealthiness of a surface ship has recently been pointed out by R. J. Furey in his U.S. Pat. No. 5,222,455 dated Jun. 29, 1993 (assigned to the U.S. Navy). He proposed to reduce or eliminate a ship's wake by sucking off the portion of the boundary layer closest to the hull and expelling it alongside the ship.

b) "Blowing." Again, as reviewed by Lachmann, another way of influencing (and energizing) the boundary layer is by means of air blown from certain strategic locations on the vehicle. For example, an air jet blown from the wing's trailing edge has a significant effect on lift and drag. Such systems are known by the name "jet flap" and "circulation control" systems. They have been demonstrated to be quite effective for certain purposes. However, the ducting required for channeling the air from the jet engine to the trailing edge and the losses inherent in such systems are major obstacles to their adoption.

c) "Lift enhancement." The problem of suppressing flow separation becomes particularly acute in the design of high-lift airfoils. As shown by Liebeck in the *Journal of Aircraft*, Vol. 7, pp. 409–415, September-October 1970, the process of flow deceleration from the suction peak near the leading edge to the trailing edge on the airfoils upper surface is governed by the maximum allowable adverse pressure gradient.

d) "Boundary Layer Tripping Devices." Still another method of boundary layer control is to trigger the transition of the laminar boundary layer into a turbulent boundary layer by means of small protuberances on the airfoil surface.

e) "Riblets and Large Eddy Breakup Devices." In recent years it has also been recognized that small-geometry surface configurations can have a beneficial (i.e., drag reduction) effect on the turbulent boundary layer. U.S. Pat. No. 5,386,955, issued on Feb. 7, 1995, awarded to M. Savill of Rolls Royce, falls into this category, wherein a series of streamwise riblets of different heights is arranged.

f) "Boundary Layer Propulsion." The idea of boundary layer propulsion seems to have been first proposed and analyzed by A. M. O. Smith and H. E. Howard in their paper "The Jet Airplane Utilizing Boundary Layer Air for Propulsion", *J. Aeronautical Sciences*, February 1947, pp. 97–109 and by F. H. Reynst in a series of papers published in the book "Pulsating Combustion", Pergamon Press 1961. Both studies showed significant benefits derivable from the use of the boundary layer air instead of the free-stream air (as is done in conventional systems). Reynst had also developed a new pulsating combustion engine which had no moving mechanical parts. This engine used pulsating combustion similar to the pulse-jet engine developed in Germany during World War II and used on the V-1 flying bombs. In contrast to the V-1 engine, however, no mechanical valves were required. Because of the simplicity of his engine, Reynst felt that the arrangement of pulsating combustion engines along the wing trailing edge could be a practical boundary layer propulsion system. No such system was ever built, however, and it is questionable whether the inherently low propulsive efficiencies of pulsating combustion engines would ever lead to a practical system. Ideally, the slowing down of the fluid particles in the boundary layer and the resulting momentum loss (and therefore drag production) should be prevented by the installation of small propellers along the wing's trailing edge. In this way, the development of an adverse pressure gradient region could be avoided and the transition from laminar to turbulent flow and the formation of a separated flow region near the trailing edge could be prevented. Unfortunately, the use of small propellers would pose an extremely complicated mechanical installation problem. Potentially, the propellers could be replaced by small jet engines. However, here again the development and installation of small engines would be quite difficult.

g) "Flapping Foil Propulsion." Thrust generation due to wing flapping was first explained by Knoller in Flug- und Motortechnik, Wien, Vol. 3, No. 21, pp. 1–7, 1909 and by Betz in Zeitschrift fur Flugtechnik und Motorluftschiffahrt, Vol. 3, pp. 269–272, January 1912. In 1936, Garrick showed in NACA Report 567 that pure wing flapping (plunging without pitching) produces thrust at a propulsive efficiency of only 50%, unless the wing oscillation occurs at very low frequency. The interest in using flapping foil propulsors therefore remained low in subsequent years. However, in 1965 W. Schmidt showed in Zeitschrift fur Flugwissenschaften, Vol. 13, pp. 472–479 that the propulsive efficiency can be increased quite substantially if a tandem airfoil combination is used whereby the forward airfoil is excited into a flapping motion while the rearward airfoil is kept stationary. He called this propulsion system a wave propeller and he demonstrated its applicability on a catamaran boat. It appears that this German work remained unknown in the United States because in 1968 Scherer, of Hydronautics Research Inc., proposed a flapping foil propulsor for use on a shallow-draft boat which used only single flapping airfoils. Quite recently, Triantafyllou and Barrett recognized that the relatively low propulsive efficiency of the single-foil pure-flapping propulsor can be improved by combining the flapping motion with a simultaneous pitching motion. This system is described in their U.S. Pat. No. 5,401,196, issued Mar. 28, 1995.

SUMMARY OF THE INVENTION

It is argued that the concept of boundary layer propulsion is sound, but that it is critically dependent on the use of an efficient and practical propulsion system which is easy to install and operate, and which makes it possible to capture and accelerate the boundary layer flow over an air or marine vehicle. A need therefore exists for a propulsion mechanism suitable for this task. From the discussion of the Related Art, above, it can be seen that not only recognizing the importance of capturing the boundary layer, but also accelerating it as a method for increasing propulsion and lift while also reducing drag has escaped those skilled in the art until now. The implementation of the boundary layer propulsion concept, therefore, is critically dependent on the use of an efficient and practical propulsion (thrust) system which is easy to install and operate and which makes it possible to capture and accelerate the boundary layer flow.

Accordingly, this invention addresses the problem of drag reduction of air or marine vehicles. The efficient and practical boundary layer energization offered by this invention makes it possible to design airfoils and ship hulls which permit the delay of boundary layer transition from laminar to turbulent flow. Laminar flow profiles have a substantially lower skin friction and hence lower overall drag. However, such profiles are also prone to boundary layer separation unless active boundary layer control is used. As outlined above, until now active boundary layer control was limited to boundary layer suction or blowing schemes. The proposed invention offers a third means of active boundary layer control.

The invention also addresses the problem of designing airfoils with significantly increased adverse pressure gradient regions without incurring flow separation. Such airfoils will generate higher lift coefficients.

This invention also addresses the problem of control force generation by permitting a simple and fast action method of generating control forces by the use of a three-element airfoil configuration. Rotation (angle of attack changes) of the conventional flap downstream of the flapping foil will change the lift generated on the flap and hence will produce significant control moment increments.

This invention can also be applied to minimize or to prevent the formation of wakes behind airfoils and wings.

The invention can also be applied to any duct flow problem where flow separation may be encountered due to an adverse pressure gradient. Flapping foil flow control can be used to suppress flow separation.

OBJECTS OF THIS INVENTION

It is an object of this invention to provide such a system which is based on the addition of crucial new elements to the already known flapping foil propulsion systems.

It is a further object of this invention to provide a propulsion mechanism for use on aircraft wings and fuselages and on ship hulls such that the boundary layer is captured, is prevented from flow separation, and is given an additional momentum. In this way the pressure drag is minimized and additional thrust is generated. To achieve this objective, one or more small flapping foils are mounted close to the wing of an aircraft near the wing's trailing edge or close to the hull surface on a ship's stern. Although Schmidt and Triantafyllou & Barrett have presented flapping foil propulsors with higher propulsive efficiencies than previously attainable with single-foil pure-flapping propulsors, they have failed to recognize the crucial importance of boundary layer propulsion, namely (i) to prevent the formation of a significant boundary layer along the wetted surface, (ii) to suppress the formation of a significant wake immediately downstream of the airfoils trailing edge or the ship's stern, and, most importantly, (iii) to suppress boundary layer flow separation on the airfoil or ship hull.

Another object of this invention is to recognize that efficient boundary layer propulsion can be achieved by arranging flapping airfoils in the boundary layer for the purpose of re-energizing and accelerating the boundary layer and thereby preventing flow separation and wake formation.

It is a further object of this invention to provide a propulsion mechanism for use on aircraft wings and fuselages, and on ship hulls such that the boundary layer is captured, is prevented from flow separation, and is given an additional momentum. In this way the pressure drag is minimized and additional thrust is generated. To achieve this objective, one or more small foils are mounted close to the wing of an aircraft near the wing's trailing edge or close to the hull surface on a ship's stern. These foils are excited into a pure flapping (heaving or plunging) motion by means of a suitable mechanical, electromechanical or hydraulic excitation system. The flapping motion, typically, will be purely sinusoidal with the maximum attainable frequency. The flapping amplitude, typically, will be a fraction of the foil's chord length, say 5 or 10 percent of chord. A crucial element of the proposed invention is the wing or hull shape in the vicinity of the flapping foils.

These objects and other objects and advantages of the present invention will become more fully understood by reference to the following Description taken in conjunction with the attached Drawings.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements. The representation in each of the figures is diagrammatic and no attempt is made to indicate actual scales or precise ratios.

FIG. 14 depicts a thrust augmenting ejector where the primary jet flow is induced by the flapping airfoil.

Figure 1:
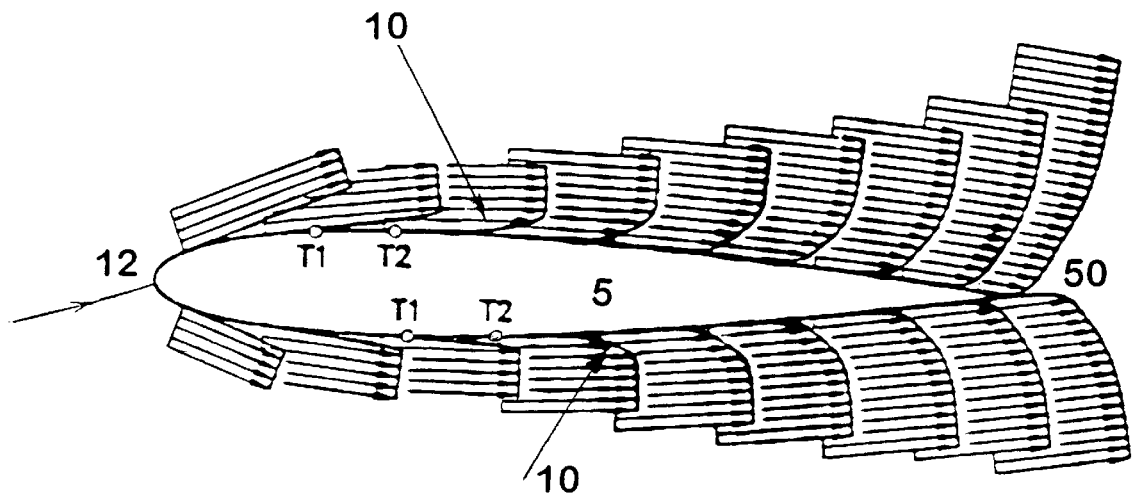
FIG. 1, 1a, 1b, & 1c depict an airfoil showing air flowing over it to illustrate the various fluid flow features (laminar, transitional, turbulent boundary layer flow and flow separation).
Figure 1A:
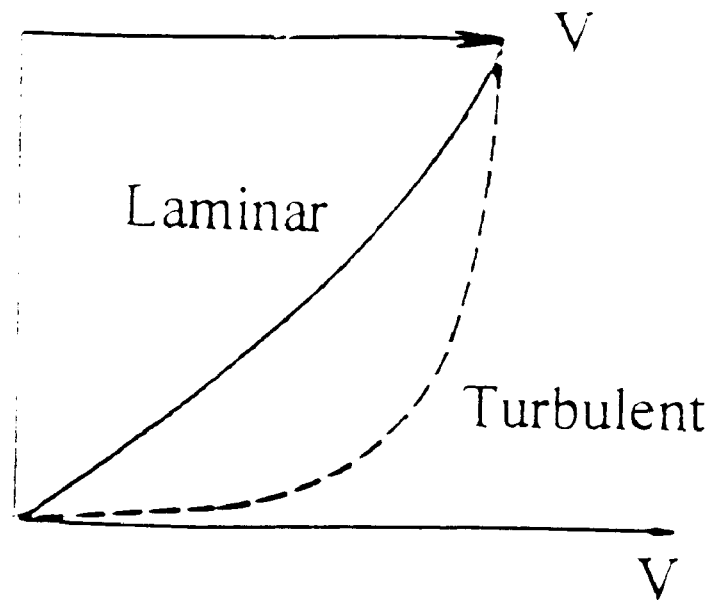
Figure 1B:
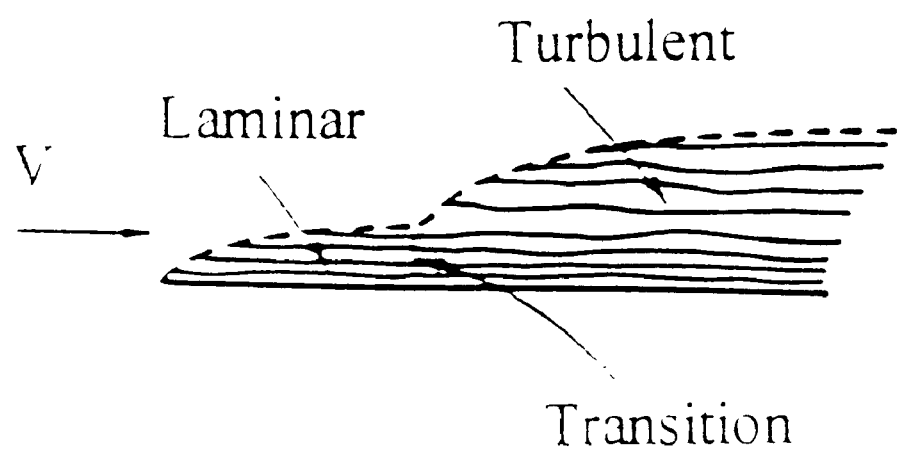
Figure 1C:
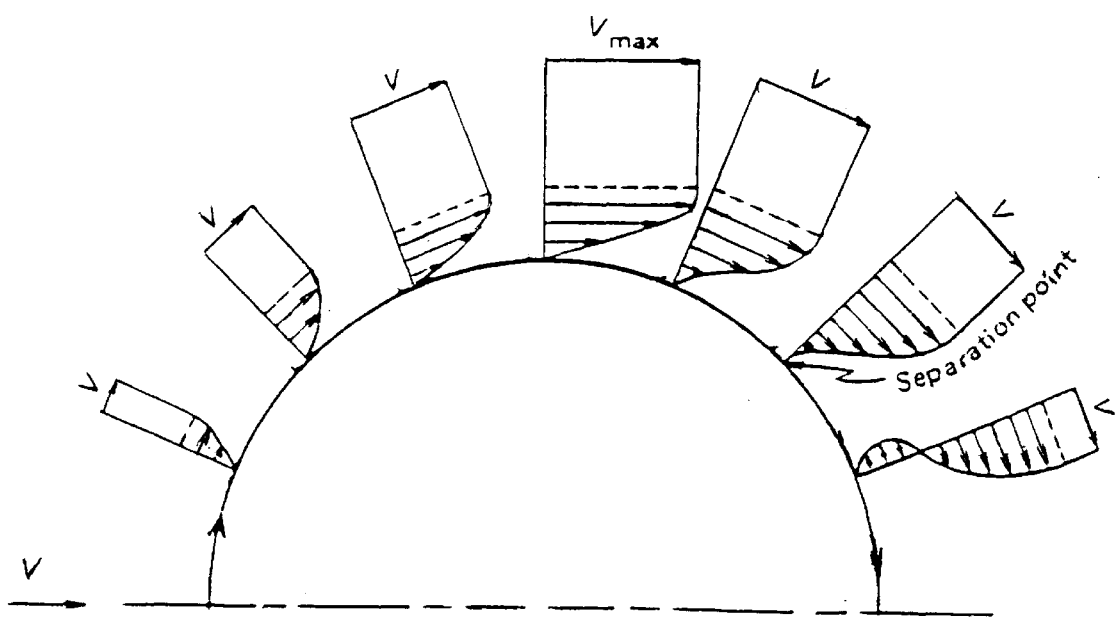

While the present invention is susceptible to various modifications and alternative forms, specific embodiments have been shown by way of example in the Drawings and will be described in detail herein. It should be understood, however, that they are not intended to limit the invention to the particular forms disclosed. On the contrary, the invention is to cover all modifications, equivalents, and alternatives falling within the spirit and scope of the invention.

GLOSSARY

The following list of elements are referred to in the drawings representing a New Integrated Propulsion—Lift—Control System for Aircraft and Ship Applications.

5. AIRFOIL
6. AIRFOIL CHORD
7. AIRFOIL UPPER SURFACE
8. AIRFOIL LOWER SURFACE
10. BOUNDARY LAYER [the thin layer of air in contact/ adjacent to a solid surface over which air or water is flowing. The Boundary Layer begins at the surface of the aircraft where the air in immediate contact with the surface is at zero velocity relative to the surface; the outer edge of the Boundary Layer is at air-stream velocity. There is thus a velocity gradient in this layer and a stress is produced in the layer. The skin-friction drag is the result of the stresses produced in this layer. The Boundary Layer starts as a "Laminar Layer which terminates abruptly in a Transition Region after which the Boundary Layer becomes Turbulent and increases in thickness. The Boundary Layer is illustrated in FIG. 1.

It is known that the drag of the Laminar Boundary Layer is much lower than the drag of the Turbulent Layer, hence it is important to design for Laminar Layers! The Transition from the Laminar Boundary Layer Flow to the Turbulent Layer occurs at a critical value of the Reynolds number.
12. FRONT STAGNATION POINT
15. LAMINAR BOUNDARY LAYER
20. WETTED SURFACE
25. TURBULENT LAYER
30. REYNOLDS NUMBER=Inertial Force/Viscous Force
35. SEPARATED FLOW (Flow Separation)
40. PRESSURE DRAG
45. FLUID PARTICLE
50. REAR STAGNATION POINT
55. PRESSURE DROP AREA
60. PRESSURE DIFFERENCE
65. STATIC PRESSURE of the undisturbed flow
70. SKIN FRICTION
75. BOUNDARY LAYER SEPARATION
76. DUCT
77. DUCT FLOW
80. SEPARATED FLOW REGION 85. TURBULENT BOUNDARY LAYER
90. LAMINAR BOUNDARY LAYER
95. MOMENTUM LOSS
100. ADVERSE PRESSURE REGION
105. FREE-STREAM AIR
110. THRUST
115. FLAPPING FOIL PROPULSORS
120. WAVE PROPELLER
125. WAKE (Wake formation)
130. BOUNDARY LAYER REDUCTION
135. RE-ENERGIZING AND ACCELERATING the boundary layer
140. FLAPPING AIRFOIL
145.

REDUCED FREQUENCY =

$$\frac{\text{(FLAPPING FREQUENCY} \times \text{CHORD LENGTH)}}{\text{FLOW VELOCITY}}$$

150. INCREASING REDUCED FREQUENCY
155. JET EFFECT/JET VELOCITY
160. MOMENTUM INCREASE
165. THRUST DEPENDENCE
170. PUMPING EFFECT OF A FLAPPING FOIL
175. VELOCITY DISTRIBUTION
180. SMALL AIRFOIL oscillated in the flapping mode
185. WALL EFFECT
190. DRAG/PRESSURE DRAG
195. BOUNDARY LAYER PROPULSION
200. BOUNDARY LAYER TRANSITION from Laminar Flow to Turbulent Flow
205. LIFT/HIGH LIFT/HIGHER-LIFT COEFFICIENTS
210. SUCTION PEAK
213. FAVORABLE PRESSURE GRADIENT—BOUNDARY LAYER flow proceeding along the airfoil surface from a region of high pressure to one of low pressure.
215. ADVERSE PRESSURE GRADIENT—BOUNDARY LAYER flow proceeding along the airfoil surface from a region of low pressure to one of high pressure, the boundary layer flow will almost immediately undergo TRANSITION FROM THE LAMINAR STATE TO THE TURBULENT STATE.
216. BOUNDARY LAYER PHENOMENON—There is a tendency of the boundary layer to become thicker and thicker as the flow proceeds against an adverse pressure gradient. The velocity U of the layers of air next to the surface becomes more and more retarded until the velocity above the surface, instead of increasing, remains equal to zero for a short distance. Under these conditions, the air will react to the higher pressure downstream, and will actually begin to flow upstream along the surface, forcing the free stream flow away from the airfoil surface. Such a flow is said to be "Separated", and the point at which it occurs is termed the "Separation Point".
220. CONTROL FORCES
225. CONTROL MOMENT/CONTROL MOMENT INCREMENTS
230. JET-LIKE VELOCITY PROFILE
235. BOUNDARY LAYER PROPULSION
240. PULSATING COMBUSTORS
245. FAVORABLE PRESSURE GRADIENT
250. RECOMPRESSION
255. LOW PRESSURE ZONE
260. FREE-STREAM PRESSURE
265. FLAPPING FOIL PROPULSORS
270. CUSPED SHAPE
275. ADVERSE PRESSURE GRADIENT REGION
280. INDUCED DRAG=drag due to the production of lift
285. TOTAL RESISTANCE of an aircraft is composed of three parts: SKIN FRICTION DRAG due to viscosity of air; form or PRESSURE DRAG, and the drag due to production of LIFT (INDUCED DRAG).

DESCRIPTION OF THE PREFERRED EMBODIMENT(S)

It is important to recognize that the boundary layer 10 grows from zero thickness at the front stagnation point 12 of an airfoil 5 to significant values near the rear stagnation point 50, as illustrated in FIG. 1. If an airfoil shape is to be found which produces high lift 205 and small drag 190, the speed of the fluid particles 45 which flow near the airfoil's upper surface 7 (see FIG. 2) needs to be increased to large values so that (according to Bernoulli's law) a large pressure drop 55 can be achieved. This, in turn, will produce a significant pressure difference 60 between the lower 8 (see FIG. 2) and upper 7 airfoil surface and hence produce a significant lifting force 207. However, near the trailing edge of the airfoil 122 the pressure 251 has to approach the static pressure 252 of the undisturbed air flow 253. This requires the fluid particles 45 near the upper surface 7 to flow into a region of increased pressure (adverse pressure gradient region 100). As a consequence, the flow in the boundary layer 10 quickly changes from laminar flow 23 to turbulent flow 24 and hence increases the skin friction or, even worse, the boundary layer 10 starts to separate 75 and a large pressure drag 40 is produced. Even when the boundary layer 10 stays attached over most of the airfoil 5, its thickness may increase to ten or fifteen percent of airfoil chord 6 and a small separated flow region 35 always develops near the trailing edge 122.

Figure 3:
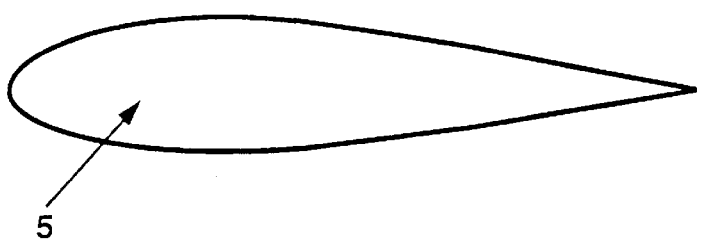
FIG. 3 depicts an airfoil with air passing over it and the reduced velocity of air immediately behind the airfoil. This situation produces drag.
Figure 3:
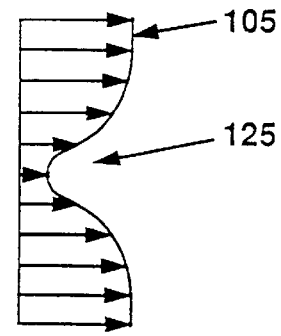
Figure 4:
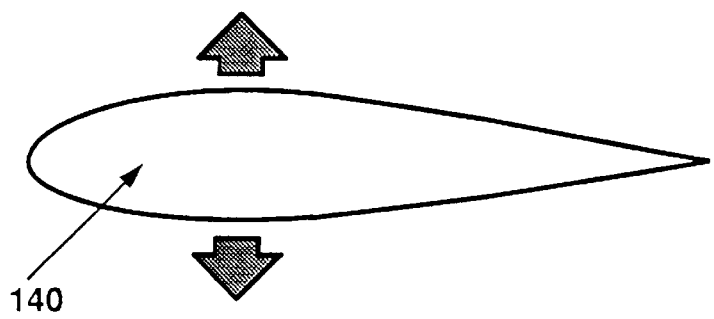
FIG. 4 depicts an airfoil energized into a flapping motion which creates a higher (i.e., a jet) velocity in the air directly behind the airfoil. The jet indicates the generation of thrust.
Figure 4:
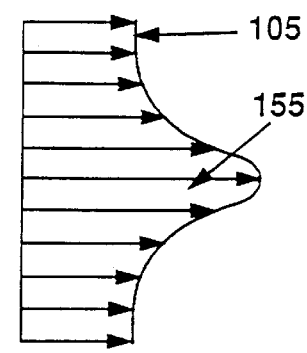

The crucial new element introduced by the present invention is the recognition that efficient boundary layer propulsion 195 can be achieved by arranging flapping (plunging) airfoils 140 in the boundary layer 10 for the purpose of re-energizing and accelerating the boundary layer 10 and thereby preventing flow separation 35 and wake formation 125. The air flow behind the stationary (non-flapping) airfoil 5 typically has the distribution shown in FIG. 3. In fact, the reduction in velocity (called the wake 125) is a direct measure of the drag 39 generated by the airfoil S. In contrast, FIG. 4 shows the measured and computed velocity distribution behind a flapping [plunging] airfoil 140. It is seen that flapping [plunging] of an airfoil 140 generates a significant velocity increase (Jet Effect 155 ) over the free stream air speed 105 (by almost a factor of two). Hence airfoil flapping [plunging] produces a jet effect 155 which is a direct measure of the thrust 110 (rather than drag 190)) produced by the flapping [plunging] airfoil 140. This jet effect 155 is significantly enhanced if the airfoil is flapping near a flat plate or near an airfoil surface (wall effect 185). These measurements and computations were performed at NPS and are documented by I. H. Tuncer and M. F. Platzer, "Thrust Generation due to Airfoil Flapping, AIAA Journal, Vol. 34, No. 2, pp. 324–331, February 1996; by K. D. Jones, C. M. Dohring, M. F. Platzer, "Wake Structures behind Plunging Airfoils: A Comparison of Numerical and Experimental Results," AIAA Paper No. 96-0078, January 1996; and by C. M. Dohring, M. F. Platzer, K. D. Jones, I. H. Tuncer, "Computational and Experimental Investigation of the Wakes shed from Flapping Airfoils and their Wake Interference/impingement Characteristics," 78th AGARD Fluid Dynamics Panel Symposium, Paper No. 33, Trondheim, Norway, 20–23 May 1996.

It is important to note two effects which have not been recognized in the past and which demonstrate the superiority and practicality of the new boundary layer propulsion system over previous systems. First, the pumping effect 170 of a flapping [plunging] airfoil 140 increases with increasing reduced frequency 150. The reduced frequency k is defined as the product of the flapping [plunging] foil's flapping frequency f times the flapping [plunging] foil's chord length c divided by the flow velocity U, i.e., $$k = \frac{2\pi fc}{U}$$

Figure 5:
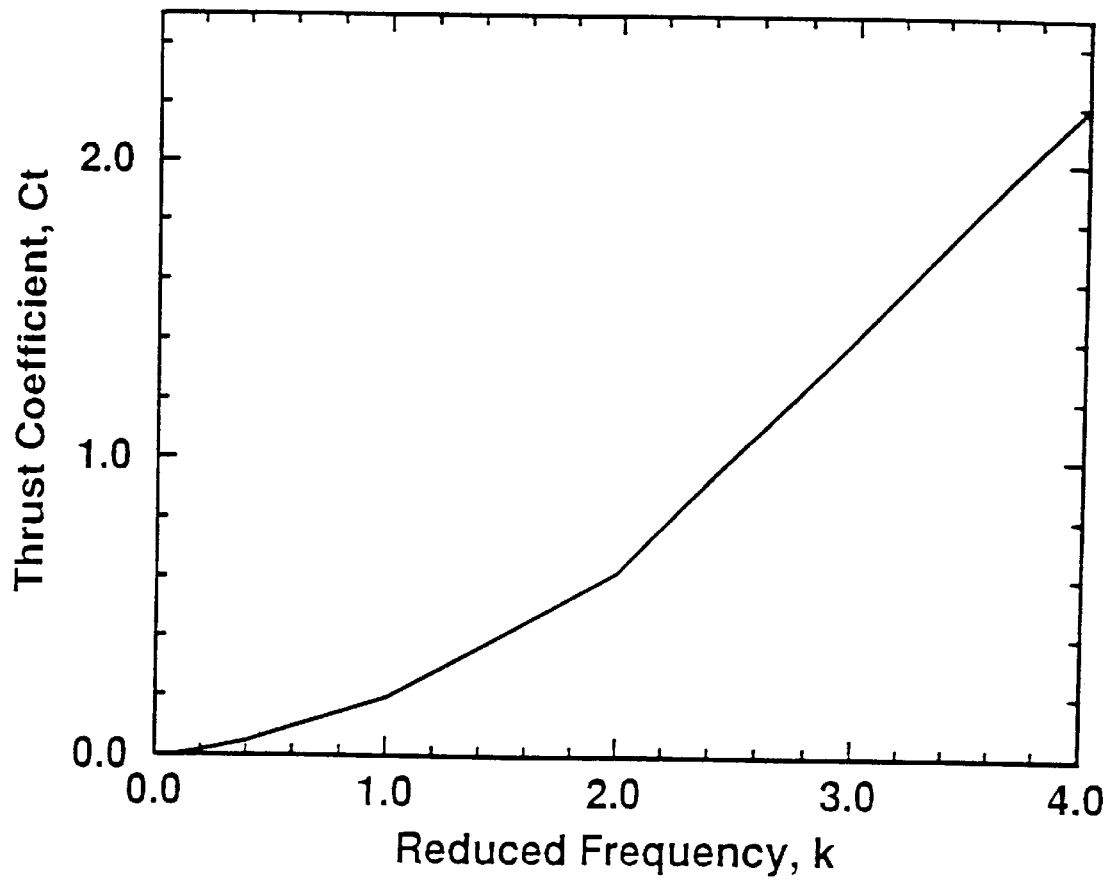
FIG. 5 depicts the thrust obtained by a flapping airfoil, whereby the thrust increases as the reduced frequency is increased.

A flapping [plunging] foil 140 mounted in a boundary layer 10 always operates in a very low velocity field 174 and therefore operates at a high reduced frequency 145. This means that the flapping [plunging] foil 140 generates a substantial jet effect 155 and hence imparts a significant momentum increase 96 to the boundary layer flow. This effect has been measured in the NPS water tunnel. FIG. 5 shows the measured thrust 165 dependence on the reduced frequency 145. It is seen that the thrust 165 increases significantly with reduced frequency 145.

Figure 6:
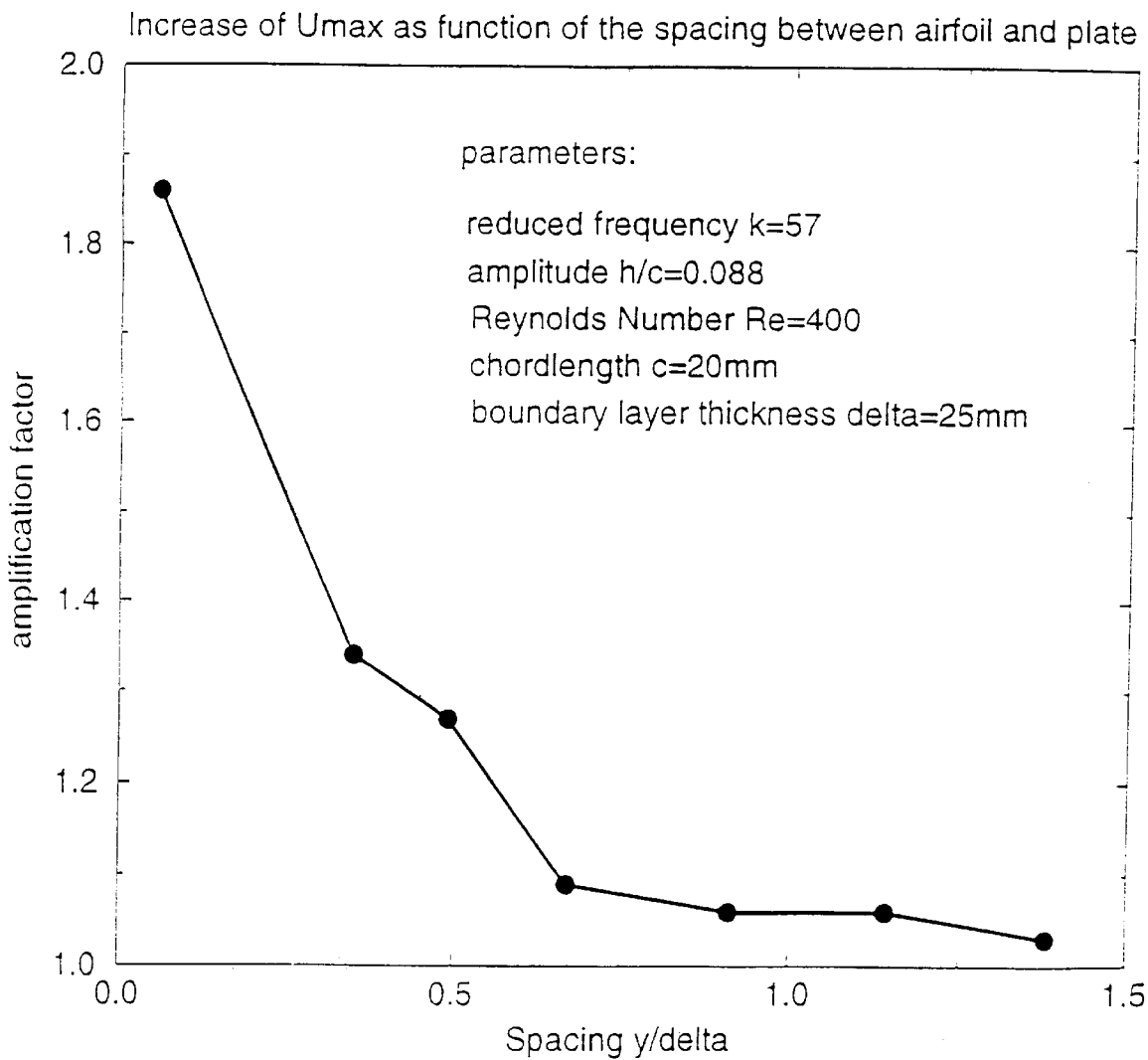
FIG. 6 is a graph obtained in the Naval Postgraduate School (NPS) water tunnel tests, showing the increase in jet velocity and therefore increase in thrust as the foil flaps juxtapose a flat plate. The foil is located in the boundary layer if spacing y/delta is less than one. (Note: y is the distance of the foil from the plate and U is the boundary layer thickness).

And Second, the pumping effect 170 of a flapping [plunging] airfoil 140 is enhanced if the flapping foil is mounted close to a wall 184 (as is necessarily the case if the flapping [plunging] airfoil 140 is located in a boundary layer 10). In recent tests in the NPS water tunnel, quantitative measurements of the velocity distribution 175 in the boundary layer 10 of a flat plate (simulating a "wall" (184)) have been made. A small airfoil of 20 mm chord length was mounted next to a flat plate and oscillated in the flapping [plunging] mode with non-dimensional flapping amplitude of 0.088 at a reduced frequency of 57. FIG. 6 shows that the jet velocity 155 downstream of the oscillating airfoil 140 that is mounted next to the flat plate (wall) 184 is about twice as large as the jet velocity 155 generated in the absence of the flat plate or "wall". This favorable "wall effect" 185 has never been demonstrated and measured prior to this experiment.

In aircraft engineering several attempts have been made to develop "ornithopters". Such craft imitate bird flight and therefore are based on the concept of flapping the complete wings. In contrast, the proposed invention is based on the concept of flapping very small foils in the boundary layer of a conventional fixed wing or ship hull. Even though some people may be familiar with the fact that flapping foils generate thrust, the proposed invention requires the recognition that flapping foils generate a jet-like velocity profile 155 downstream of the flapping [plunging] airfoil 140 which can be used for boundary layer re-energization and propulsion 19. In contrast, a stationary (non-flapping) airfoil generates a wake velocity profile 125, as shown in FIG. 3. The recently completed NPS water tunnel tests are the first tests where this jet-velocity 155 profile was measured (see FIG. 4) and where it was established that this jet effect 155 is significantly enhanced by the wall effect 185 (see FIG. 6). Furthermore, it requires the recognition that it is advantageous to use boundary layer propulsion 195 in spite of the fact that the installation and operation of small vibrating foils on an aircraft wing or on a ship hull is likely to be regarded as undesirable because of the possible excitation of structural vibrations of the wing or hull.

Figure 2:
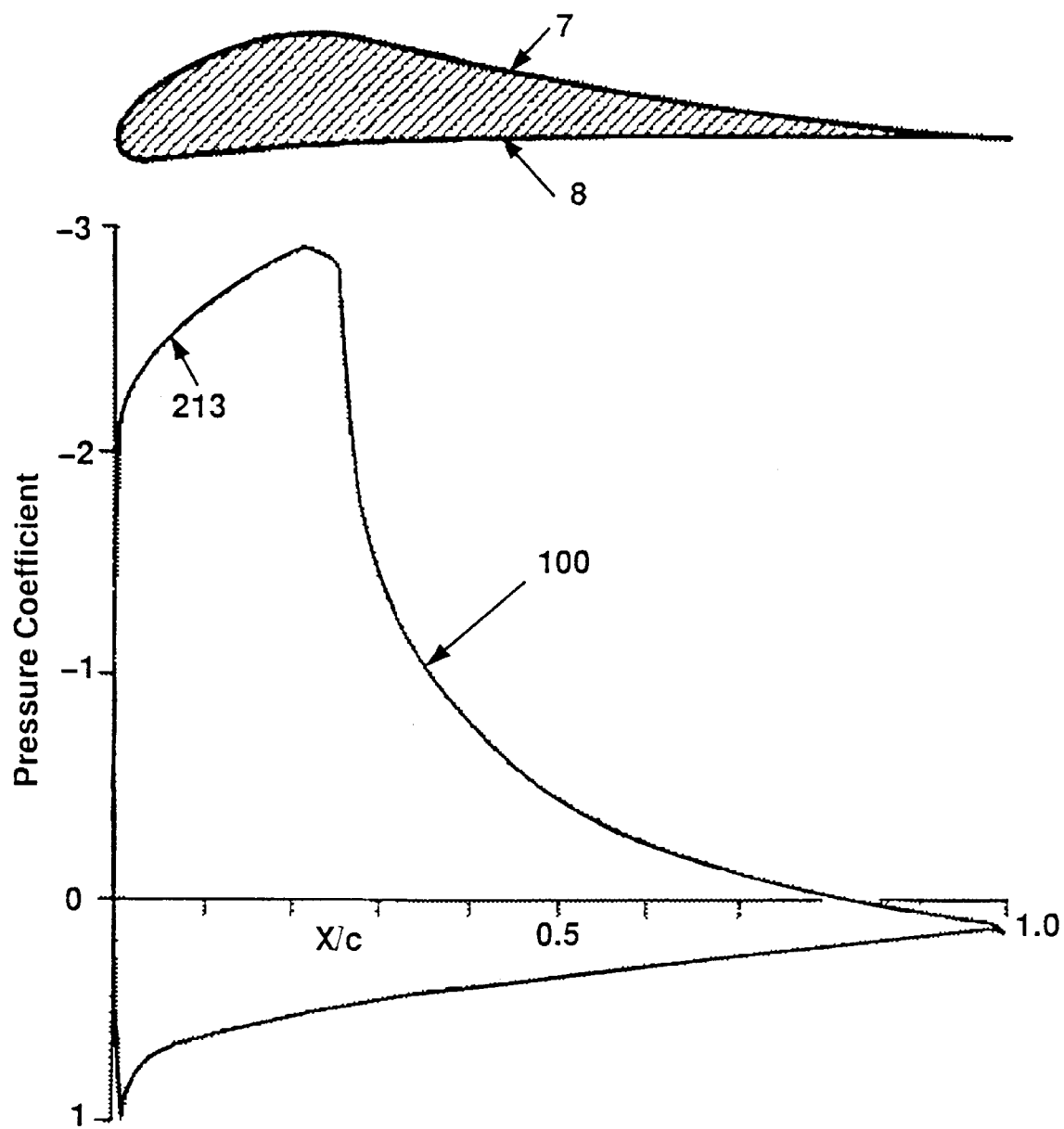
FIG. 2 depicts an airfoil showing relationship between the lower surface of the foil having larger pressure than the upper surface, thereby creating lift on the airfoil.
Figure 7:
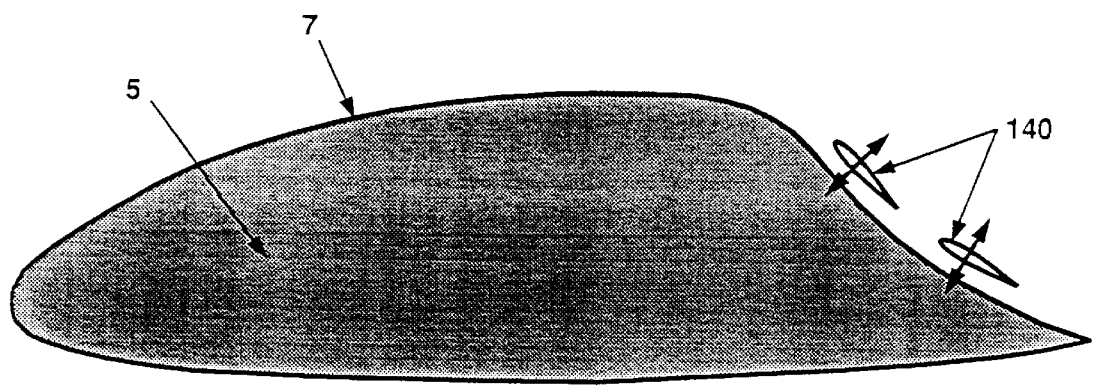
FIG. 7 depicts an airfoil showing two small flapping airfoils placed in the adverse pressure gradient area of the top surface of the wing near the trailing edge.
Figure 8:
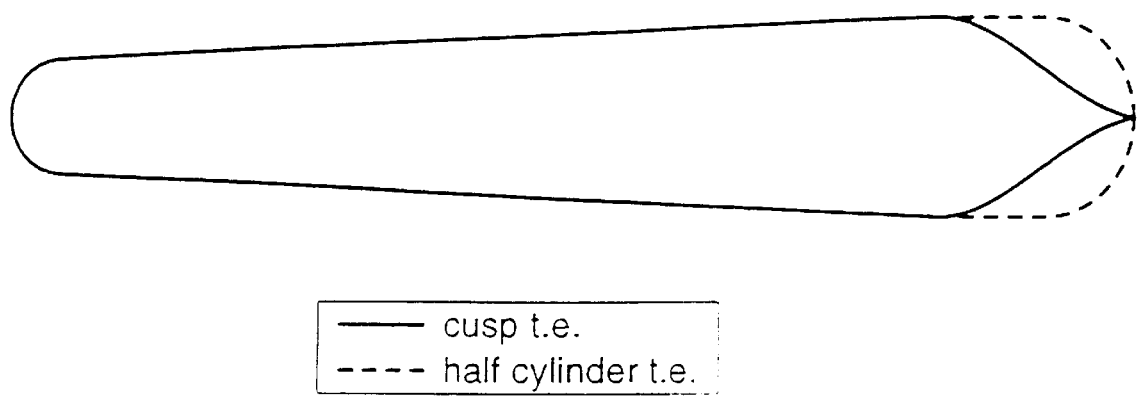
FIG. 8 depicts two different airfoil tested in the NPS water tunnel, one with a cusped trailing edge and the other a round trailing edge.
Figure 9:
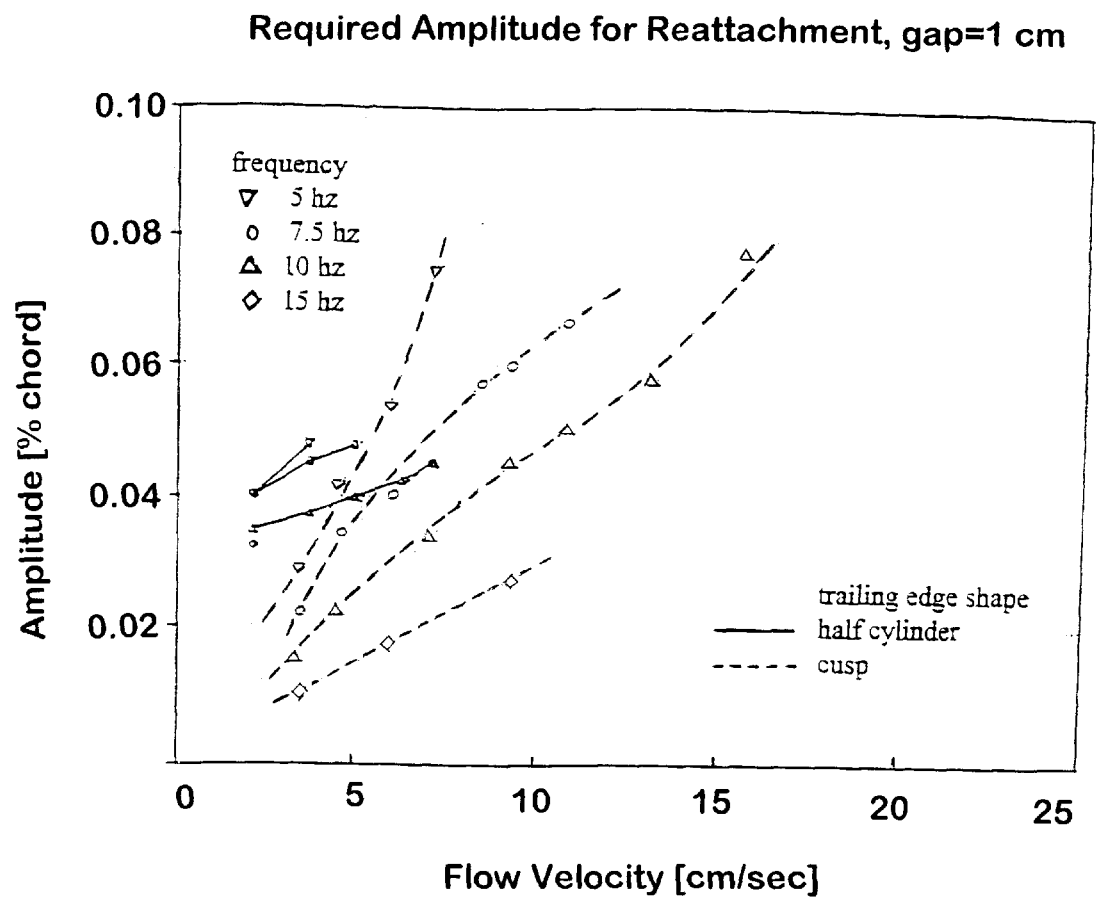
FIG. 9 depicts the graph obtained from the NPS water tunnel tests to confirm amplitude required for re-attachment of fluid flow to a ship's hull.

It is advantageous to provide a favorable pressure gradient 213, see FIG. 2, on a lifting airfoil 5 as long as possible. Therefore, the point of maximum thickness of the airfoil 5 should be located as far downstream as possible, i.e., near the trailing edge of the lifting airfoil. However, as can be seen on FIG. 2, the velocity decrease and therefore the pressure increase may not exceed a certain critical value if separation is to be avoided. This, therefore, requires a certain distance between the point of maximum thickness and the trailing edge. This distance can be shortened by the use of an active boundary layer control, i.e., flapping/plunging foil 140. The installation of flapping foil propulsors 140 in the concave part of the upper surface 7 of an airfoil 5, as shown in FIG. 7, will capture the boundary layer 10, prevent its separation, and thrust it toward the trailing edge of the airfoil. The effectiveness of this arrangement has already been demonstrated in NPS water tunnel tests. FIG. 8 shows an airfoil 5 with either a "cusped" 270 or with a rounded trailing edge 271. For simplicity, the flapping [plunging] foil 140 was mounted in the wake 125 downstream of the trailing edges. As expected, the flow started to separate at the start of the adverse pressure gradient region 215 (after the point of maximum airfoil thickness) if the flapping [plunging] foil 140 was not oscillating. However, the boundary layer flow separation 75 was suppressed for a wide range of flapping frequencies and amplitudes as soon as the flapping foil was excited into flapping motion. These results are summarized on FIG. 9. It is seen that the effectiveness of suppressing the flow separation increases with increasing amplitude of the flapping foil.

Figure 10:
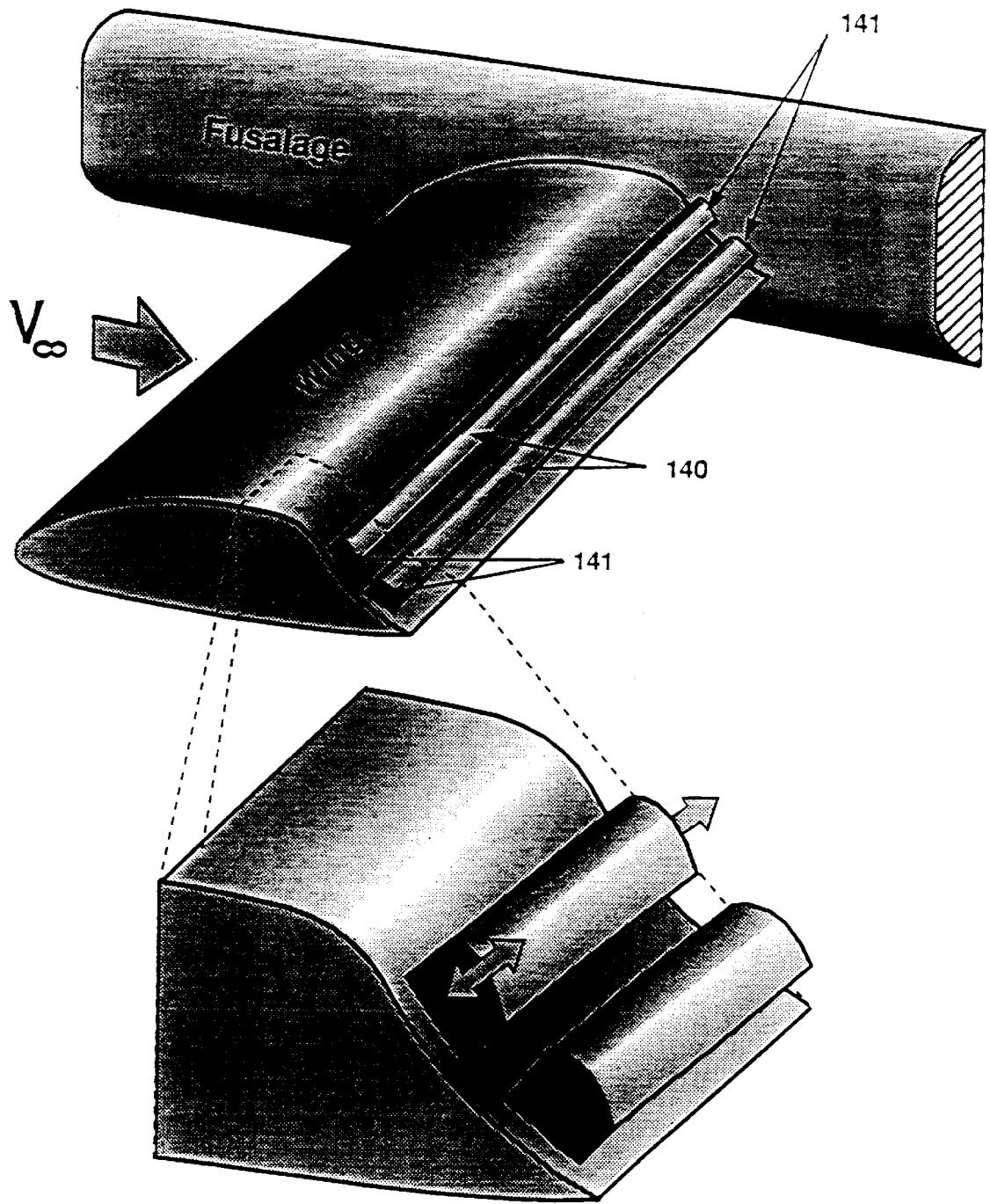
FIG. 10 depicts the top view of the aircraft wing shown in FIG. 7. It is seen that the flapping airfoils are mounted parallel to the wing surface.

In designing the flapping foil boundary layer propulsion system a number of arrangements are possible. One such arrangement is shown in FIG. 10 which presents the top view rather than the side view shown in FIG. 7. The two flapping [plunging] foils 140 extend over the full span of the conventional rectangular aircraft wing [air foil 5]. They are held by two small support plates 141 at both ends. The support plates 141 are excited into a sinusoidal flapping motion by any suitable mechanical, electromechanical or hydraulic excitation system. The manufacture and installation of such excitation systems is state-of-the-art and therefore need not be described in any specific detail. Furthermore, it is likely that the flapping foils need to be supported and excited at several locations along the span in order to avoid undesirable bending modes and vibrations.

Figure 11:
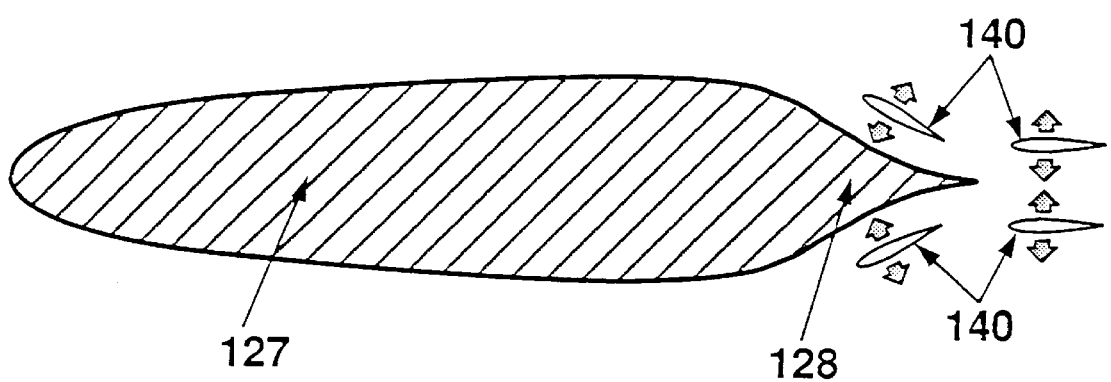
FIG. 11 depicts a ship hull with a cusped trailing edge and flapping foils both attached to the hull and trailing behind the hull.

For ship propulsion, the arrangement shown in FIG. 11 will capture the boundary layer 10 building up along a ship's hull 127. Here the flapping [plunging] foils 140 are mounted near the ship's stern 128 and extend from the top to the bottom of the ship (not shown). As before, the flapping foils 140 are attached to support plates 141 at both ends which are excited into flapping motion by any suitable excitation system. Also shown are two flapping foils 140 mounted close to but downstream of the ship's stern 128. These two foils 140 are mounted in close proximity to each other and are excited into a flapping motion which occurs in counter-phase. This arrangement is equivalent to a single flapping foil 140 near a wall and producing the "wall" effect 185. Hence the jet enhancement effect 155 will again be produced by this arrangement. Mounting twin foil 140 propulsors in the wake 125 of a conventional ship, similar to the arrangement shown in FIG. 11, will lead to the suppression of boundary layer flow separation 75, similar to the NPS test results shown in FIG. 9. The addition of a non-flapping foil downstream from the hull will further enhance the achievable thrust, due to the wave propeller effect discovered by Schmidt, or it will produce a significant control moment if this additional foil is deflected to some angle of attack.

Figure 12A:
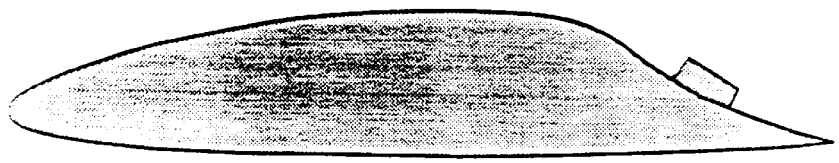
FIG. 12a depicts a cross sectional view of FIG. 12.
Figure 12:
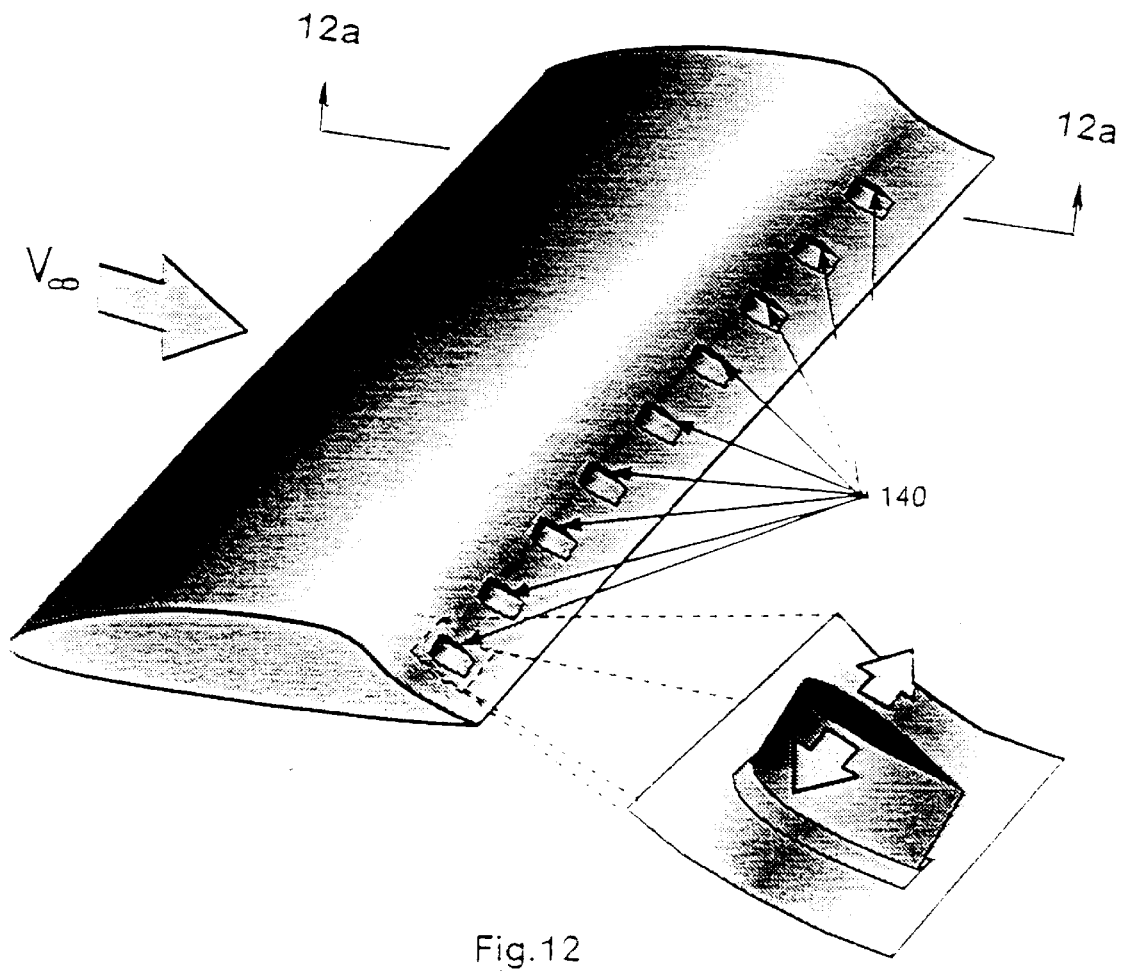
FIG. 12 depicts an aircraft wing with multiple small flapping airfoils mounted on the top and perpendicular to the wing while flapping in the spanwise direction, i.e., perpendicular to the chord plane of the airfoils.

Another arrangement is shown in FIG. 12. Here, a row of small flapping foils 140 is mounted along the wing span similar to the conventional vortex generators used on many aircraft. However, in contrast to the rigidly attached vortex generators these small flapping foils 140 are excited into a flapping [plunging] motion in the spanwise direction (perpendicular to the flight direction). These flapping foils 140 extend into the boundary layer 10 only and, therefore, as in the previous arrangement, energize the boundary layer 135. However, in this case, the vortices generated by the flapping foils 140 are highly three-dimensional due to the presence of tip vortices. Again, as before, any suitable excitation system can be used for excitation of the flapping foils and therefore no further detailed description of the various possible excitation systems is provided.

Figure 13:
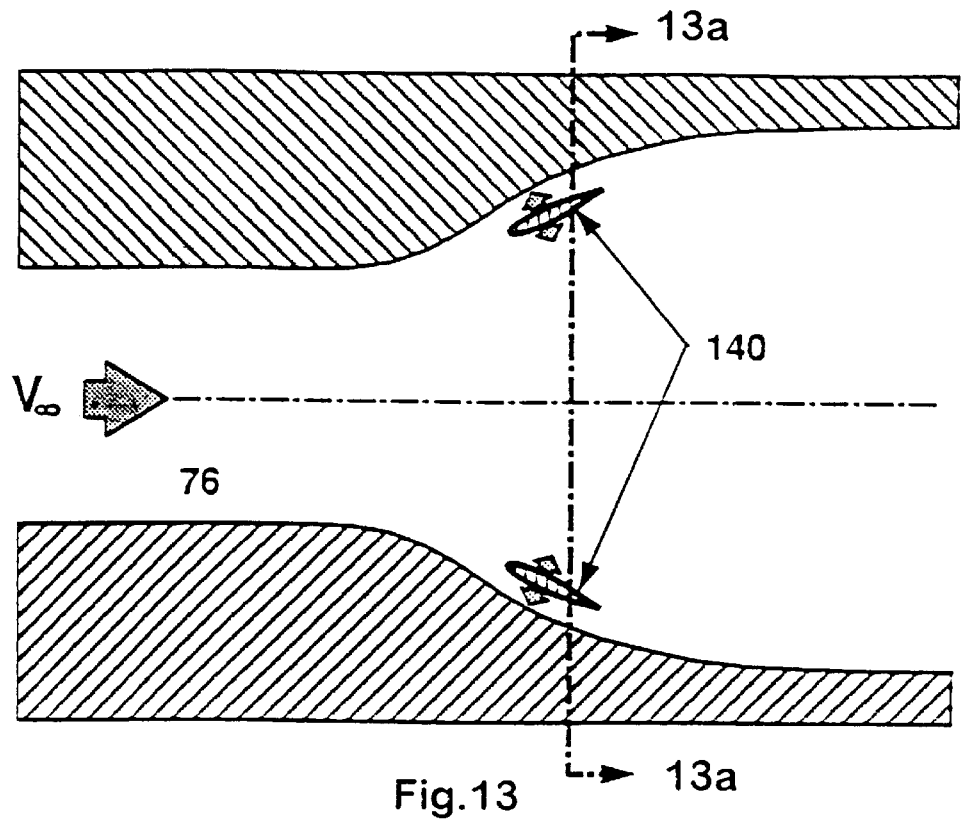
FIG. 13 depicts a square duct with the flow of a fluid flowing from left to right where the flow passes over flapping foils placed close to the duct walls.
Figure 13A:
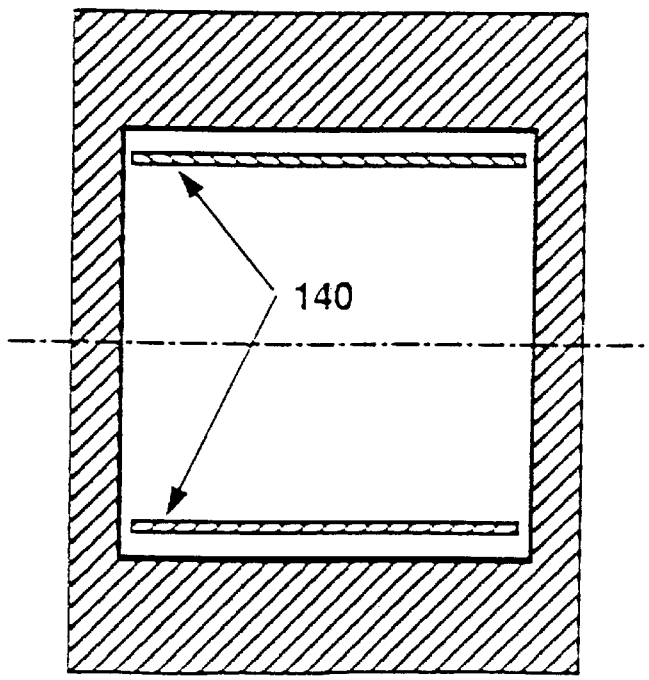
FIG. 13a depicts a cross sectional view of FIG. 13.

Flow separation 75 may also occur in any duct flow 77 due to an adverse pressure gradient 215. An arrangement suitable for duct flow separation control is shown in FIG. 13. This arrangement is similar to the one shown in FIG. 7. The flapping foils 140 span the duct 76 and are excited into flapping [plunging] motion by any suitable excitation system to reduce flow separation 35. For example, flow separation 35 may occur in the diffuser 78 shown in FIG. 13. A diffuser 78 is a duct 76 whose area widens in the direction of the air/stream flow. Installation of flapping foils 140, as shown in FIG. 13 will minimize or suppress the boundary lay flow separation 75.

In FIG. 14 another arrangement is shown which consists of an ejector configuration 290 similar to the thrust augmenting ejectors used on vertical take-off aircraft. However, instead of the primary jet nozzle a flapping airfoil 140 is used to produce the primary jet flow 291.

It will be known by those skilled in the art that various designs of foil geometry for flapping [plunging] foil use on aircraft wings or ship hulls are possible.

It will also be apparent to those skilled in the art that alterations in duct flow geometry is possible, using various shapes such as squares, rectangles, triangles, circles, ovals, ellipsoids, and all other various shapes and combinations thereof.

It will be further apparent to those skilled in the art that the specific mechanism by which the foils are energized into a flapping motion, and other variations or modifications of the apparatus and/or the methods of flapping the foils offer more possible variations to this invention.

Obviously, many modifications and variations of the present invention are possible in light of the above teachings. It is, therefore, to be understood that the present invention may be practiced within the scope of the following claims other than as described herein.

What is claimed is:

1. A new method for boundary layer energization and boundary layer propulsion for use on vehicles moving through fluids, which comprises:

mounting at least one small airfoil parallel to said vehicle's surface, said airfoil being embedded within said vehicle's boundary layer; and exciting said airfoil into flapping oscillation parallel to the chord plane of said airfoil at a frequency up to 100 cycles per second at an amplitude up to 20 percent of the chord length of said airfoil for generating a jet flow downstream of the airfoil as a direct result of its oscillation for the purpose of re-energizing and accelerating the boundary layer and thereby preventing flow separation and wake formation, whereby flow separation is delayed or suppressed on said vehicle which enables the re-design of the shape of said vehicle.

2. The method of claim 1, wherein:

the vehicle is an air vehicle.

3. The method of claim 1, wherein:

the vehicle is a marine vehicle.

4. A new method for energization and suppression of wakes shed from vehicles moving through fluids, which comprises:

mounting at least one airfoil in said vehicle's wake; and exciting said airfoils into a flapping oscillation parallel to the chord plane of said airfoil, with a frequency up to 100 cycles per second at an amplitude up to 20 percent of the chord length of said airfoil for generating a jet flow downstream of the airfoil as a direct result of its oscillation for the purpose of re-energizing and accelerating the boundary layer and thereby preventing flow separation and wake formation.

5. The method of claim 4, wherein:

the vehicle is an air vehicle.

6. The method of claim 4, wherein:

the vehicle is a marine vehicle.

7. A new method for energization and suppression of wakes shed from vehicles moving through fluids, which comprises:

mounting a pair of airfoils in said vehicle's wake; and exciting said airfoils into a flapping oscillation whereby said airfoils are flapping in counterphase, said oscillation occurring parallel to the chord plane of said airfoils at a frequency up to 100 cycles per second at an amplitude up to 20 percent of the chord length of said airfoils for generating a jet flow downstream of the airfoil as a direct result of its oscillation for the purpose of re-eneroizing and accelerating the boundary layer and thereby preventing flow separation and wake formation.

8. The method of claim 7, wherein:

the vehicle is an air vehicle.

9. The method of claim 7, wherein:

the vehicle is a marine vehicle.

10. A new method for boundary layer energization of fluids moving through a structure, which comprises:

mounting at least one small airfoil proximate the fluid boundary and juxtaposed the surface of said structure; and exciting said airfoils into a flapping oscillation at a frequency up to 100 cycles per second at an amplitude up to 20 percent of the chord length of said airfoils for generating a jet flow downstream of the airfoil as a direct result of its oscillation for the purpose of re-energizing and accelerating the boundary layer and thereby preventing flow separation and wake formation, whereby flow separation is delayed or suppressed which enables the reconfiguration of the surface of said structure.

11. The method of claim 10, wherein:

the vehicle is a flow ducdiffuser.

12. A new method for boundary layer energization and boundary layer propulsion for use on vehicles moving through fluids, which comprises:

mounting small airfoils perpendicular to the vehicle's surface, said airfoils being embedded within the said vehicle's boundary layer and juxtaposed the surface of said vehicle, said airfoils being approximately the height of the boundary layer thickness; and exciting said airfoils into flapping oscillation parallel to the chord plane of said airfoils, said oscillation at a frequency up to 100 cycles per second at an amplitude up to 20 percent of the chord length of said airfoil for generating a jet flow downstream of the airfoil as a direct result of its oscillation for the purpose of re-energizing and accelerating the boundary layer and thereby preventing flow separation and wake formation, whereby flow separation is delayed or suppressed which enables the reconfiguration of said vehicle.

13. The method of claim 12, wherein:

the vehicle is an air vehicle.

14. The method of claim 12, wherein:

the vehicle is a marine vehicle.

15. A new method of generating thrust for use on vertical/short take-off and landing (V/STOL) aircraft, which comprises:

mounting at least one airfoil proximate to and parallel to said aircraft's fuselage; and exciting said airfoil into a flapping oscillation parallel to the chord plane of said airfoil, said oscillation at a frequency up to 100 cycles per second at an amplitude up to 20 percent of said chord length of said airfoil for generating a jet flow downstream of the airfoil as a direct result of its oscillation for the purpose of re-energizing and accelerating the boundary layer and thereby preventing flow separation and wake formation.

16. A new method of generating thrust for use on vertical/short take-off and landing (V/STOL) aircraft, which comprises:

mounting at least one pair of airfoils proximate to and parallel to said aircraft's fuselage; and exciting said pair of airfoils into a counter-phase type of flapping oscillation parallel to the chord plane of said airfoils, said oscillation at a frequency up to 100 cycles per second at an amplitude up to 20 percent of the chord length of said airfoils for generating a jet flow downstream of the airfoil as a direct result of its oscillation for the purpose of re-energizing and accelerating the boundary layer and thereby preventing flow separation and wake formation, whereby a jet flow is generated by said flapping airfoils which is directed into a thrust augmenting ejector.

\* \* \* \* \*